US012804713B2

(12) United States Patent
Kim et al.

(10) Patent No.: US 12,804,713 B2
(45) Date of Patent: Nov. 17, 2026

(54) METHOD AND APPARATUS FOR TRANSMITTING SU PPDU TO PEER STA IN TXOP PERIOD ALLOCATED BY TRIGGER FRAME IN WIRELESS LAN SYSTEM

(71) Applicant: LG ELECTRONICS INC., Seoul (KR)

(72) Inventors: Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 333 days.

(21) Appl. No.: 18/038,201

(22) PCT Filed: Sep. 6, 2021

(86) PCT No.: PCT/KR2021/011991

§ 371 (c)(1),
(2) Date: May 22, 2023

(87) PCT Pub. No.: WO2022/114468

PCT Pub. Date: Jun. 2, 2022

(65) Prior Publication Data

US 2023/0413327 A1 Dec. 21, 2023

(30) Foreign Application Priority Data

Nov. 27, 2020 (KR) ........................ 10-2020-0162910

(51) Int. Cl.
*H04W 74/0816* (2024.01)
*H04W 84/12* (2009.01)

(52) U.S. Cl.
CPC ........ *H04W 74/0816* (2013.01); *H04W 84/12* (2013.01)

(58) Field of Classification Search
CPC . H04W 74/0816; H04W 84/12; H04W 74/06; H04W 74/002
See application file for complete search history.

(56) References Cited

U.S. PATENT DOCUMENTS

2006/0165073 A1* 7/2006 Gopinath .............. H04W 48/04 370/328
2013/0077610 A1* 3/2013 Amini ..................... H04L 67/12 370/338

(Continued)

FOREIGN PATENT DOCUMENTS

KR 1020170109556 9/2017

OTHER PUBLICATIONS

PCT International Application No. PCT/KR2021/011991, International Search Report dated Dec. 23, 2021, 2 pages.

(Continued)

*Primary Examiner* — Mohammad S Anwar
(74) *Attorney, Agent, or Firm* — LEE, HONG, DEGERMAN, KANG & WAIMEY

(57) ABSTRACT

Proposed are a method and apparatus for transmitting a SU PPDU to a peer STA in a TXOP period allocated by a trigger frame in a wireless LAN system. Specifically, a first STA receives an MU-RTS frame from an AP. The first STA transmits a CTS frame to the AP. The first STA transmits a first SU PPDU to the AP or a second STA. The MU-RTS frame includes information about a TXOP period in which the first SU PPDU may be transmitted. The CTS frame includes type information. The AP is set to a doze state after the CTS frame is received.

6 Claims, 20 Drawing Sheets

(56) References Cited

U.S. PATENT DOCUMENTS

| | | | | |
|---|---|---|---|---|
| 2015/0249529 | A1 | 9/2015 | Zheng et al. | |
| 2018/0035461 | A1* | 2/2018 | Kim | H04W 84/12 |
| 2021/0315009 | A1* | 10/2021 | Xia | H04W 8/04 |

OTHER PUBLICATIONS

Das et al., "AP assisted SU PPDU Tx for 11be R1," IEEE 802.11-20/1312r2, Nov. 2020, 7 pages.
Baron et al., "Triggered P2P transmissions follow up," IEEE 802.11-20/0813r6, Jul. 2020, 17 pages.
Fischer, "RTS Trigger SU PPDU," IEEE 802.11-20/1217r4, Sep. 2020, 19 pages.

* cited by examiner

METHOD AND APPARATUS FOR TRANSMITTING SU PPDU TO PEER STA IN TXOP PERIOD ALLOCATED BY TRIGGER FRAME IN WIRELESS LAN SYSTEM

CROSS-REFERENCE TO RELATED APPLICATION(S)

This application is the National Stage filing under 35 U.S.C. 371 of International Application No. PCT/KR2021/011991, filed on Sep. 6, 2021, which claims the benefit of earlier filing date and right of priority to Korean Application No. 10-2020-0162910, filed on Nov. 27, 2020, the contents of which are all incorporated by reference herein in their entirety.

TECHNICAL FIELD

The present specification relates to a PPDU transmission in a wireless LAN system, and more particularly, to a method and apparatus for transmitting an SU PPDU to a peer STA in a TXOP period allocated by a trigger frame.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for transmitting an SU PPDU to a peer STA in a TXOP period allocated by a trigger frame in a wireless LAN system.

An example of this specification proposes a method for transmitting an SU PPDU to a peer STA in a TXOP period allocated by a trigger frame.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for transmitting an SU PPDU from an STA to a peer STA in a TXOP period allocated by a trigger frame (MU-RTS frame).

A first station (STA) receives a multi user-request to send (MU-RTS) frame from an access point (AP). The MU-RTS frame may be a MU-RTS trigger frame or a MU-RTS TXOP Sharing (TXS) trigger frame.

The first STA transmits a clear to send (CTS) to the AP.

The first STA transmits a first single user (SU) physical layer protocol data unit (PPDU) to the AP or the second STA.

The MU-RTS frame includes information on a Transmission Opportunity (TXOP) period in which the first SU PPDU can be transmitted. The TXOP period may be set between the AP and the first STA from the transmission of the MU-RTS frame.

The CTS frame includes type information. The type information may be set to a first value or a second value. The first value may include information that the first SU PPDU is transmitted to the AP during the TXOP period. The second value may include information that the first SU PPDU is transmitted to the second STA during the TXOP period.

The AP may be set to a doze state after receiving the CTS frame. For example, when the type information is set to the second value, the first STA transmits the first SU PPDU to the second STA, and at this time, the AP may be set to a doze state for power saving. Since the AP is a Soft AP and the second STA is a peer STA of the first STA, when the first STA transmits a SU PPDU to the second STA, the AP not involved in transmission needs to be set to a doze state to save power.

According to the embodiment proposed in this specification, when the STA transmits the SU PPDU in the TXOP period allocated by the trigger frame, the transmission type of the SU PPDU can be known through the CTS frame. Therefore, there is an effect that the soft AP can quickly perform power saving.

DETAILED DESCRIPTION

Figure 1:
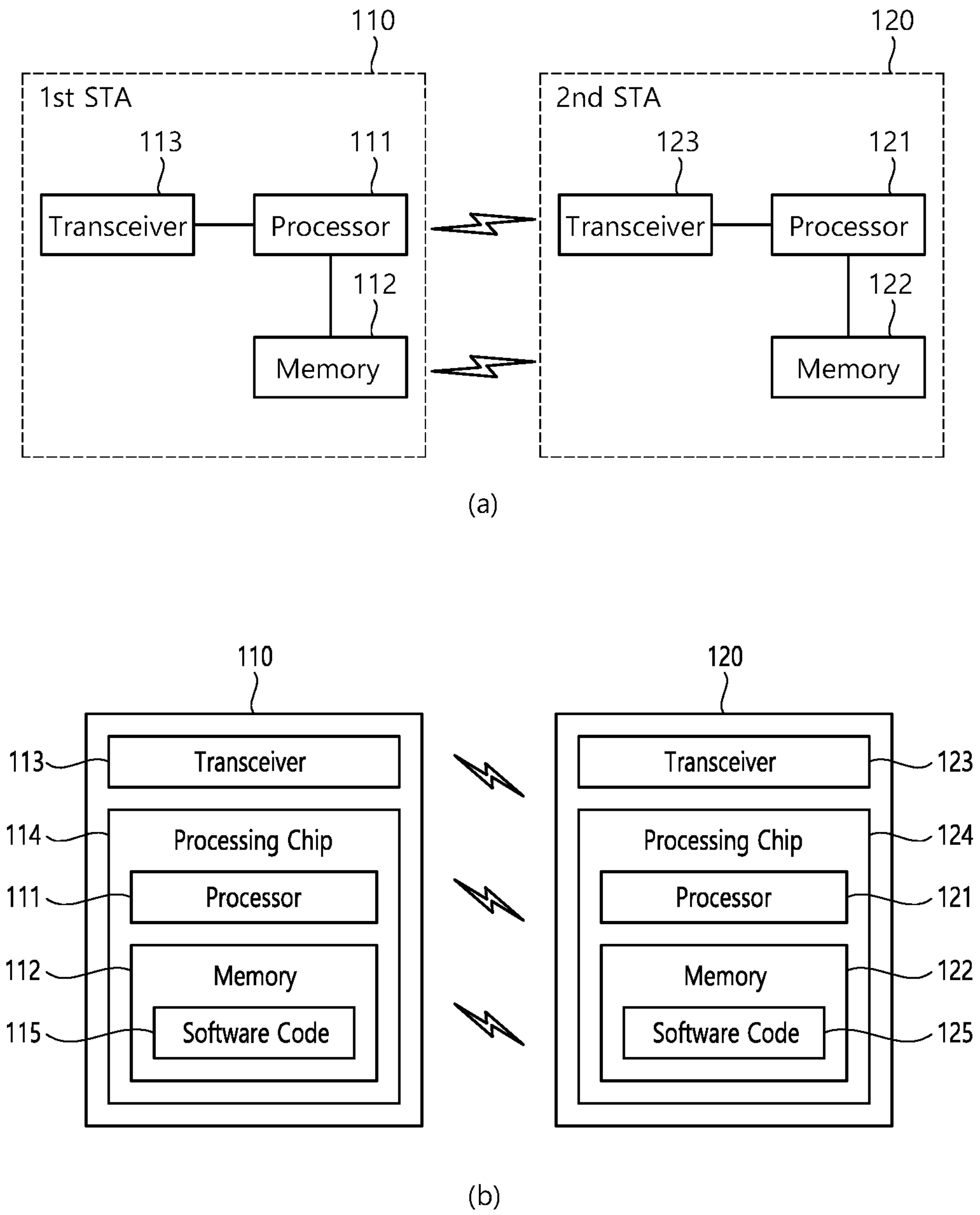
FIG. 1 shows an example of a transmitting apparatus and/or receiving apparatus of the present specification.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3$^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
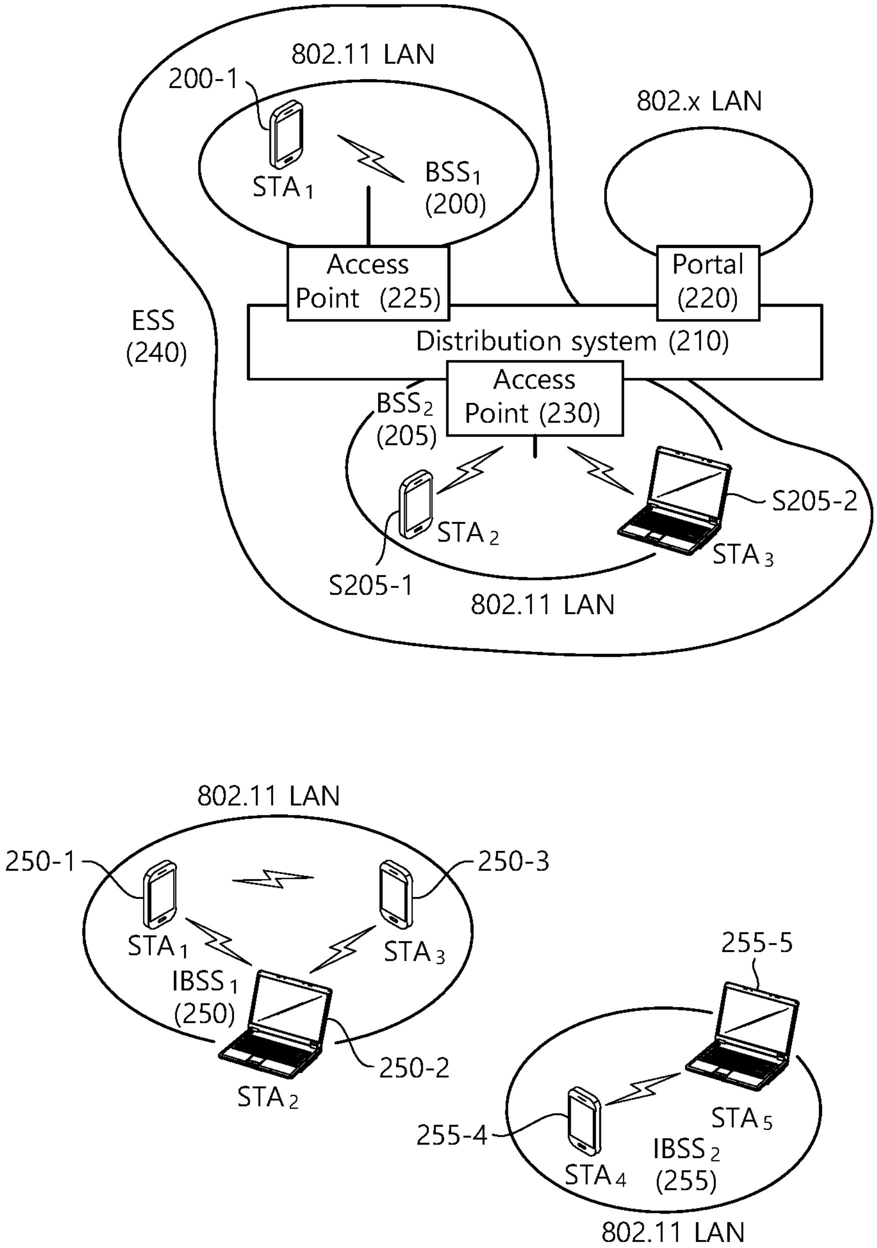
FIG. 2 is a conceptual view illustrating the structure of a wireless local area network (WLAN).

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BS Ss 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
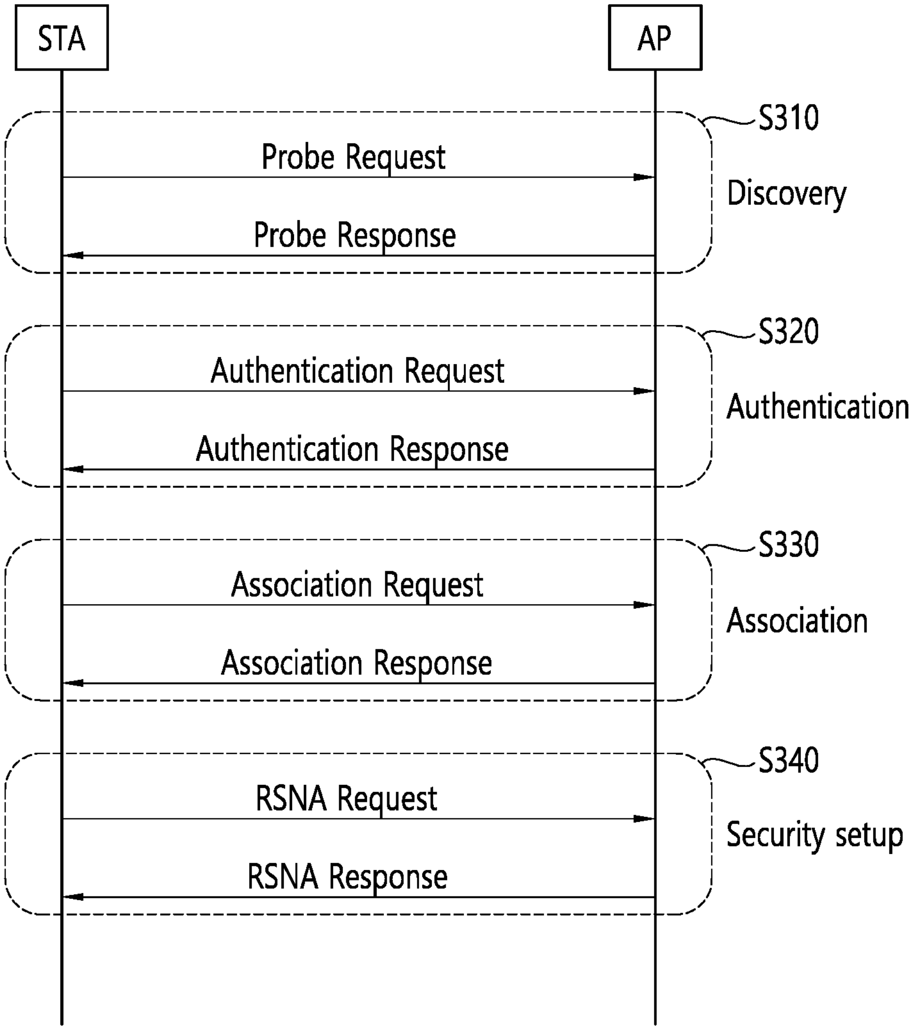
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
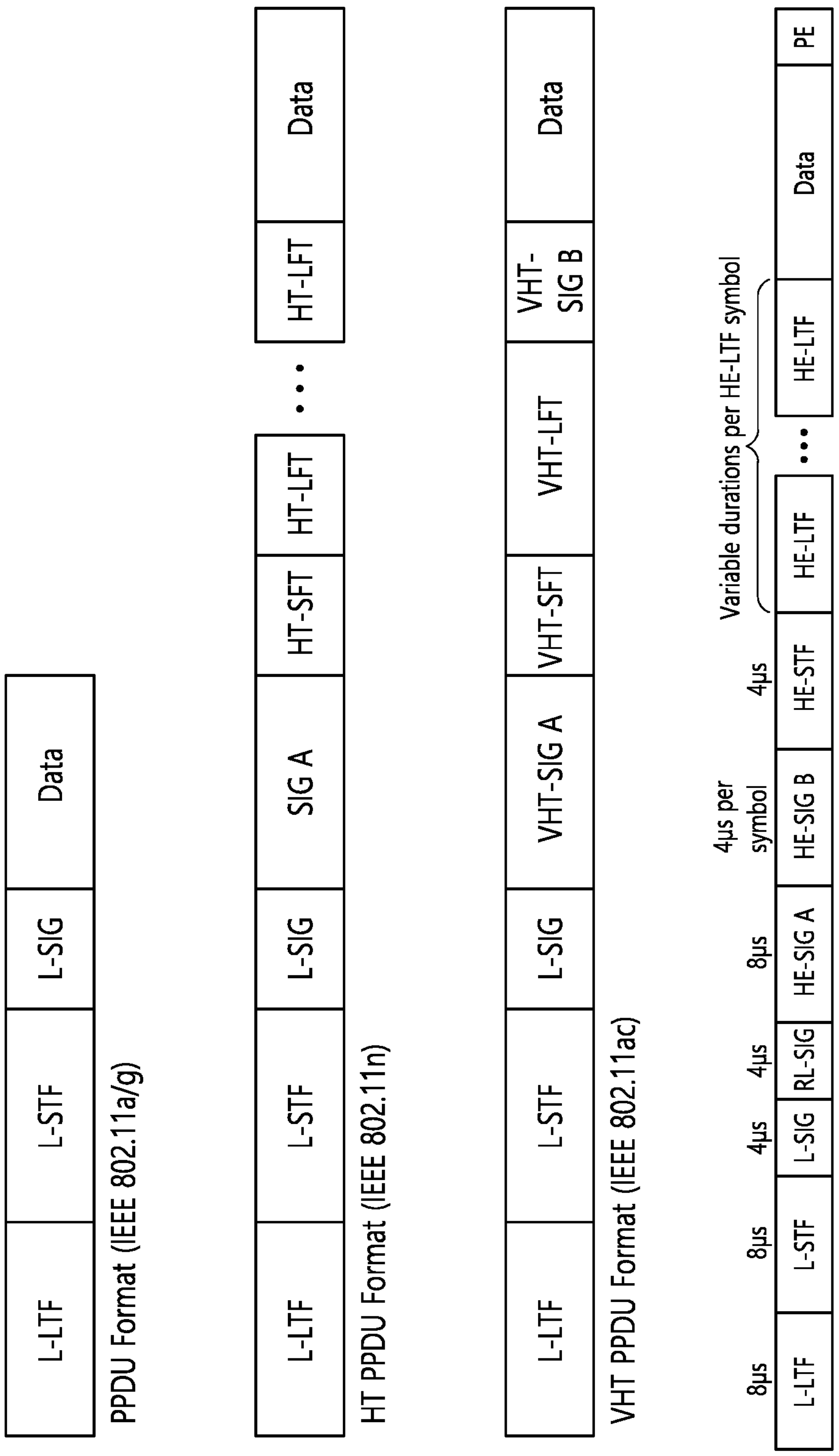
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
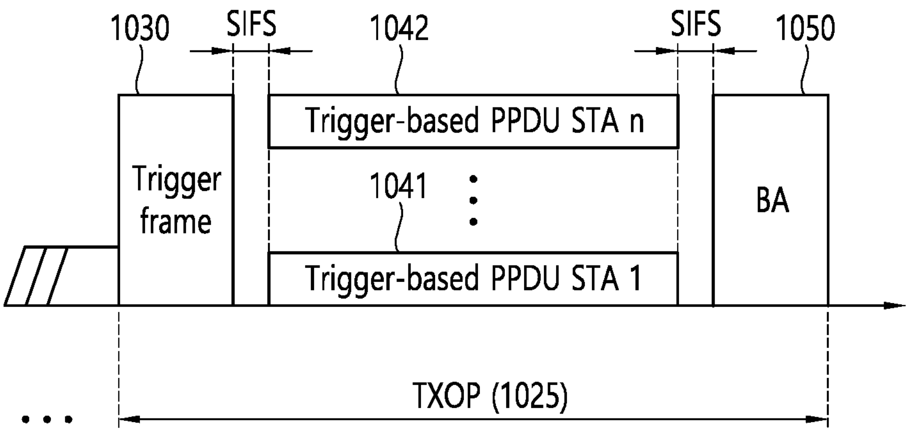
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
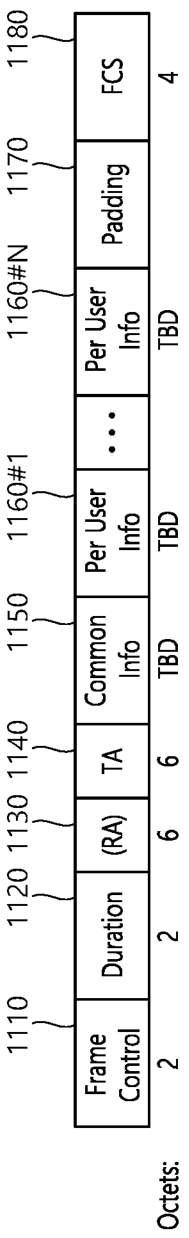
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

Figure 7:
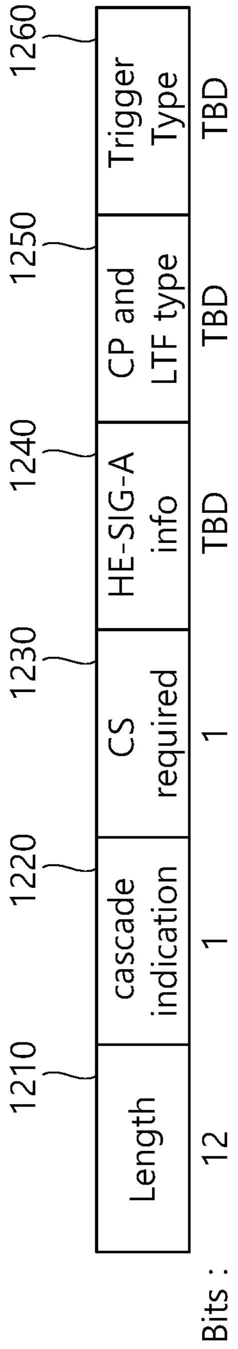
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
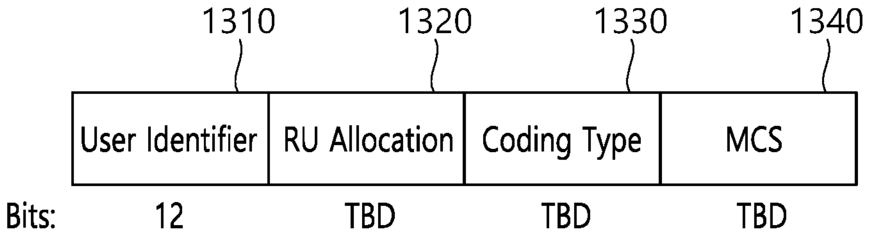
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 9:
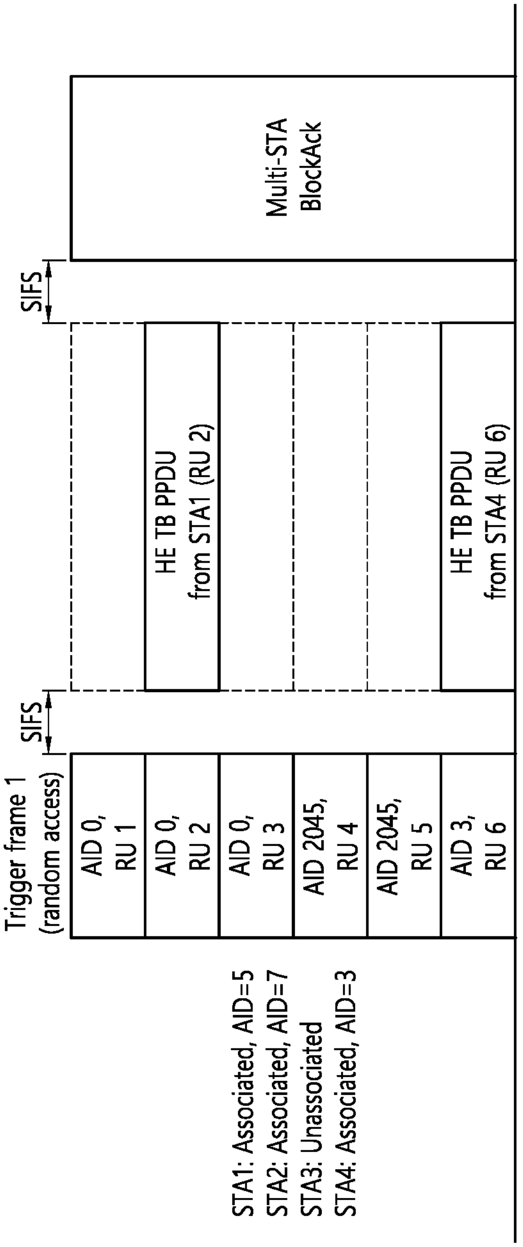
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4, RU 5), and thus the STA3 decreases the OBO counter by 2 but the OBO counter is greater than 0.

Hereinafter, a PPDU transmitted/received in a STA of the present specification will be described.

Figure 10:
FIG. 10 illustrates an example of a PPDU used in the present specification.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
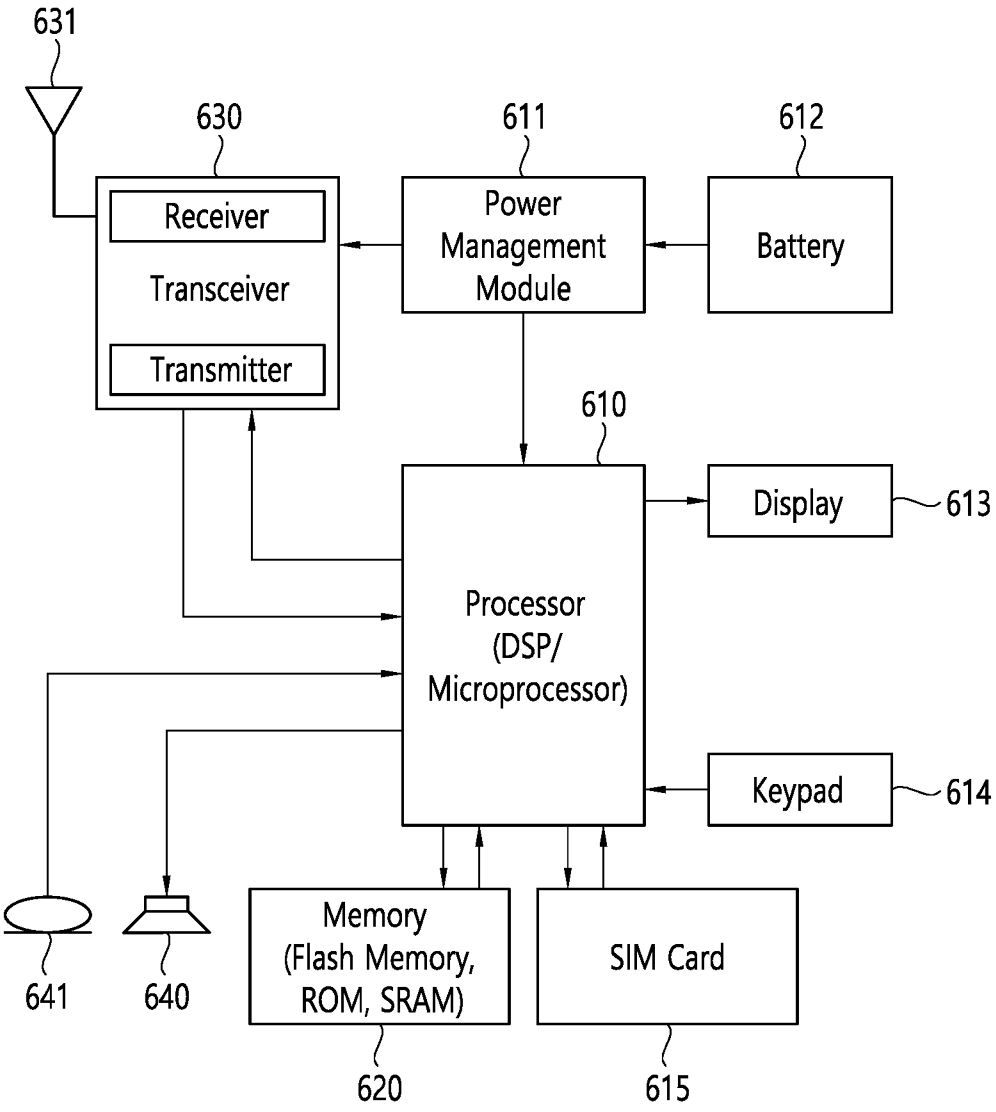
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

1. Triggered Transmission Opportunity (TXOP) Sharing Procedure

The triggered TXOP sharing procedure allows the AP to allocate only one non-AP STA a portion of the time in the acquired TXOP to transmit one or more non-TB PPDUs.

An EHT STA for which dot11EHTTXOPSharingTFOptionImplemented is true must set the Triggered TXOP Sharing Support subfield of the EHT Capabilities element to 1. If dot11EHTTXOPSharingTFOptionImplemented is false, the Triggered TXOP Sharing Support subfield is set to 0.

When an EHT STA with dot11EHTTXOPSharingTFOptionImplemented of 1 transmits or responds to a MU-RTS TXS trigger frame, the rules defined in the MU-RTS (Multi User-Request To Send) trigger/CTS (Clear To Send) frame exchange procedure and AP behavior) and additional rules defined in STA operation.

The EHT STA that updates the NAV based on the information of the MU-RTS TXS (TXOP Sharing) trigger frame as the most recent criterion resets the NAV updated by the frame unless it receives a CF-End frame that satisfies the condition of the TXOP truncation Shouldn't be.

<AP Action>

The EHT AP may transmit the MU-RTS TXS Trigger frame as defined in the parameterized MU-RTS Trigger frame format as follows to allocate time to the non-AP STA within the acquired TXOP.

There is one user information field addressed to the non-AP STA in the trigger frame.

The EHT AP shall not send a MU-RTS TXS trigger frame with a user information field addressed to an associated non-AP STA that has not received an EHT Capabilities element with the triggered TXOP Sharing Support subfield set to 1.

The TXOP Sharing Mode subfield indicates the TXOP sharing mode. The TXOP Sharing Mode subfield exists in the MU-RTS trigger frame. The MU-RTS trigger frame may be indicated by the Trigger Type subfield of the Common Info field.

TXOP Sharing Mode subfield of common information field when an MU-RTS trigger frame is transmitted by an EHT AP that intends to allocate time to a non-AP EHT STA to sequentially transmit one or more non-TB PPDUs within the acquired TXOP is set to a non-zero value. If the MU-RTS TXOP sharing procedure is not initiated by the MU-RTS trigger frame, the TXOP Sharing Mode subfield of the common information field is set to 0. The encoding of the TXOP Sharing Mode subfield is defined in the table below.

| TXOP Sharing Mode subfield value | Description |
|---|---|
| 0 | MU-RTS that does not initiate MU-RTS TXOP sharing procedure. |
| 1 | MU-RTS that initiates MU-RTS TXOP sharing procedure wherein a scheduled STA can only transmit PPDU(s) addressed to its associated AP. |
| 2 | MU-RTS that initiates MU-RTS TXOP sharing procedure wherein a scheduled STA can transmit PPDU(s) addressed to its associated AP or addressed to another STA. |
| 3 | Reserved. |

An MU-RTS trigger frame having a TXOP Sharing Mode subfield set to a non-zero value may be referred to as a MU-RTS TXS trigger frame.

The Allocation Duration subfield included in the MU-RTS TXS trigger frame indicates the time duration allocated to the non-AP STA in the TXOP obtained by the AP.

When the EHT AP receives the CTS frame in response to the MU-RTS TXS trigger frame transmitted to the non-AP STA with the TXOP Sharing Mode subfield of 1, the AP specifies and allocated in the MU-RTS TXS trigger frame as follows MUST NOT transmit a PPDU in time:

When a PPDU is not requested by a non-AP STA that requires an immediate response If the CS mechanism does not indicate that the medium is idle at a TxPIFS slot boundary after transmission of the last immediate response frame sent to that STA or reception of the last frame from that STA that does not require an immediate response.

When an EHT AP receives a CTS frame in response to a transmitted MU-RTS TXS trigger frame with a TXOP Sharing Mode subfield of 2, the AP receives a MU-RTS TXS unless a non-AP STA requiring an immediate response requests a PPDU. PPDU transmission does not start within the allotted time specified in the trigger.

Figure 12:
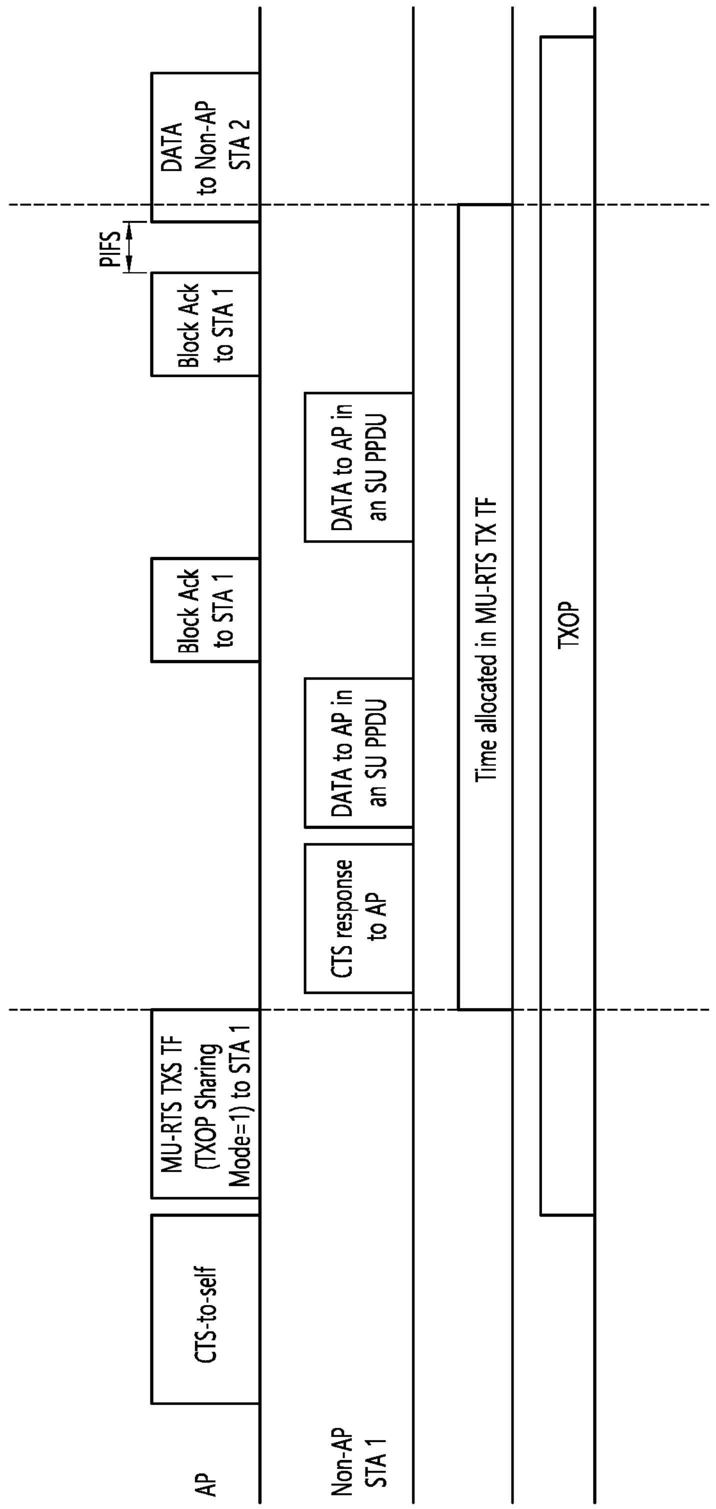
FIG. 12 shows an example in which a MU-RTS TXS trigger frame having a TXOP Sharing Mode subfield of 1 is transmitted.

FIG. 12 shows an example in which a MU-RTS TXS trigger frame having a TXOP Sharing Mode subfield of 1 is transmitted.

FIG. 12 illustrates an example of exchanging UL non-TB PPDUs transmitted by a scheduled STA within an allocated time with an MU-RTS TXS trigger frame having a TXOP Sharing Mode subfield value of 1. Referring to FIG. 12, the AP transmits a MU-RTS TXS trigger frame (TXOP Sharing Mode=1) to Non-AP STA 1, and the Non-AP STA 1 within the time allocated by the MU RTS TXS trigger frame A CTS response and DATA (SU PPDU) as a response to the MU-RTS TXS trigger frame may be transmitted to the AP.

Figure 13:
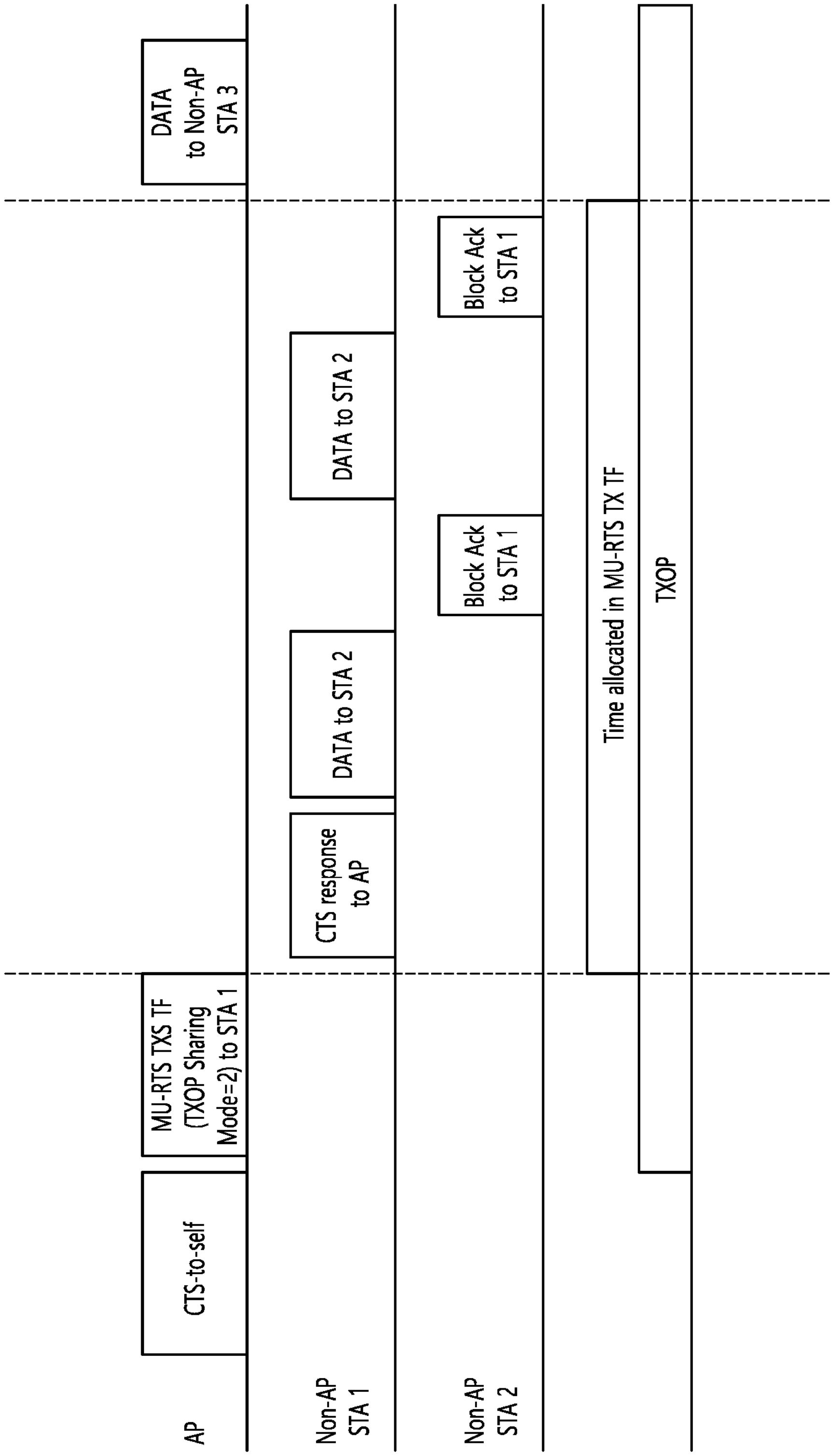
FIG. 13 shows an example in which a MU-RTS TXS trigger frame having a TXOP Sharing Mode subfield of 2 is transmitted.

FIG. 13 shows an example in which a MU-RTS TXS trigger frame having a TXOP Sharing Mode subfield of 2 is transmitted.

FIG. 13 illustrates an example of exchanging PPDUs transmitted from a scheduled STA to another STA (peer STA) within an allocated time and an MU-RTS TXS trigger frame having a TXOP Sharing Mode subfield value of 2. Referring to FIG. 13, the AP transmits a MU-RTS TXS trigger frame (TXOP Sharing Mode=2) to Non-AP STA 1, and the Non-AP STA 1 within a time allocated by the MU RTS TXS trigger frame A CTS response, which is a response to the MU-RTS TXS trigger frame, may be transmitted to the AP, and DATA may also be transmitted to Non-AP STA 2.

<Sta Operation>

After the non-AP STA receives the MU-RTS TXS trigger frame from the associated AP containing the addressed User Info field, the STA receives one or more non-TB PPDU must be transmitted. The first PPDU of the exchange shall be a CTS frame transmitted according to the rules defined in the CTS frame response to the MU-RTS trigger frame.

During the allocated time, if the value of the TXOP Sharing Mode subfield is 2, the non-AP STA can transmit the non-TB PPDU to its associated AP or other STA (Peer STA). When the value of the TXOP Sharing Mode subfield is 1, transmission is possible only to the AP.

The 802.11ax WLAN system introduced a triggered UL operation to improve medium and QoS management efficiency in a congested BS S. In the trigger-based operation of 802.11ax, the AP must calculate Modulation and Coding Scheme (MCS), Number of Spatial Stream (NSS), and Tx power of the STA side, and collect Buffer Status Report (BSR) information for media efficiency. The length of the TB PPDU must be calculated by incurring a padding penalty.

To solve the UL contention problem, only a low-complexity trigger-based mechanism is required whereby the AP simply allocates time within a TXOP to one STA at a time. The STA may use time allocation to transmit the UL SU PPDU to the AP. The STA may use time allocation for a peer to peer (P2P) link.

This mechanism complements the limited TWT proposal in which the AP improves the QoS performance of the STA in the BSS (included in the P2P link) by limiting UL contention. This may be referred to as AP-assisted SU PPDU transmission.

The AP schedules one connected STA at a time by a trigger frame. The trigger frame includes a duration of time for an Intra-TXOP Service Period (SP) starting SIFS after triggering.

During the Intra-TXOP SP, the scheduled STA transmits one or more non-TB PPDUs. The STA performs desired operations such as P2P transmission and UL transmission during the Intra-TXOP SP. The AP nominally regains control of the medium at the end of the assignment.

i) If the medium is idle for a Point Interframe Space (PIFS) after a Single User-Trigger Frame (SU-TF), ii) In the case of SIFS after the time known from the scheduled STA as the interval information of the frame, iii) In the case of SIFS after receiving a frame such as a QoS null frame transmitted from a scheduled STA to an AP, the AP may regain control authority earlier.

The MU-RTS frame is an 802.11ax trigger frame with several reserved fields and triggers CTS. Here, the MU-RTS frame may be modified to request another SU PPDU.

In addition, a Reserved field can be used to inform whether this frame is for P2P transmission or UL transmission, and can be signaled as follows in a specific field. A value of 0 corresponds to baseline MU-RTS, a value of 1 corresponds to UL only traffic, and a value of 2 may correspond to P2P traffic (or UL traffic in addition). Other values are reserved.

In addition, a specific field may signal intra-TXOP SP duration.

In addition, a specific field may signal whether the first frame of the intra-TXOP SP should be a CTS frame in order for the AP to confirm the allocation. However, if the AP does not request the STA to transmit the CTS, the STA may transmit the CTS (continue to transmit the CTS or skip the CTS transmission).

Figure 14:
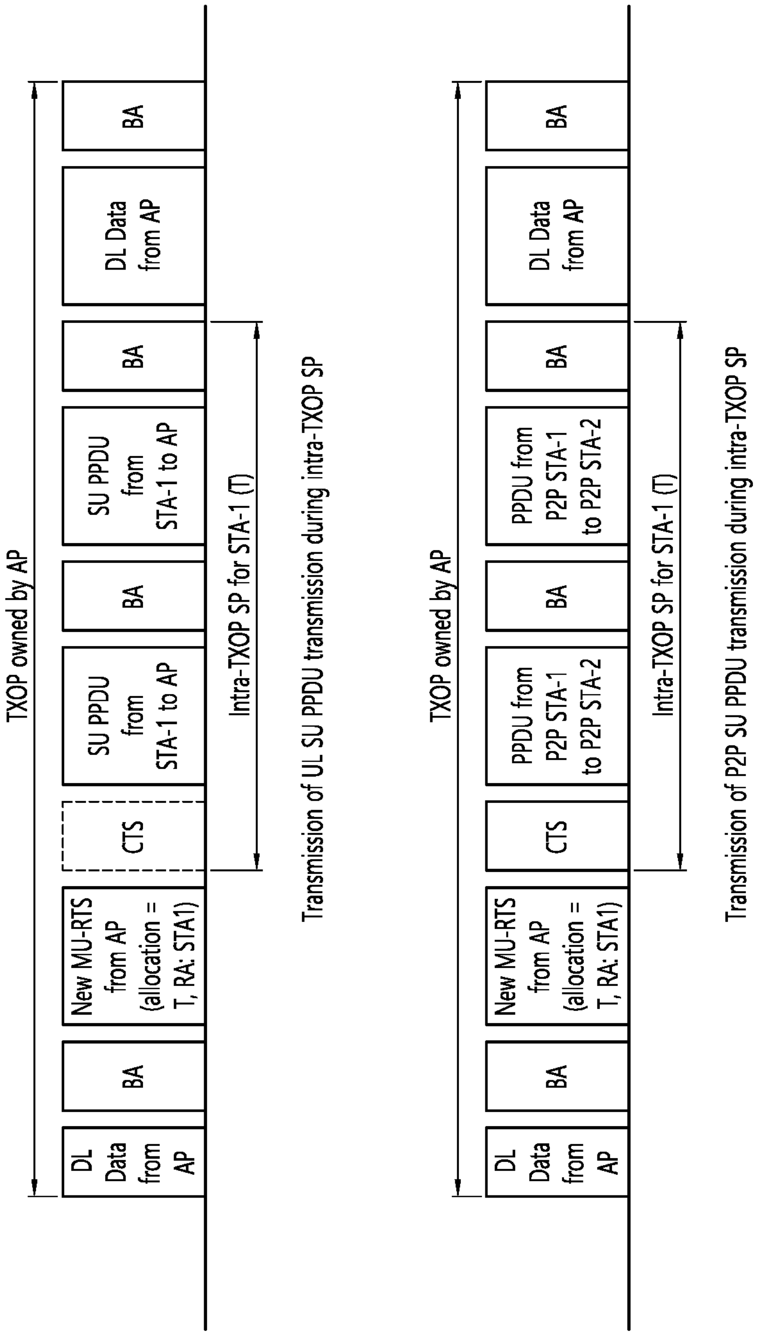
FIG. 14 shows UL SU PPDU transmission and P2P SU PPDU transmission during intra-TXOP SP.

FIG. 14 shows UL SU PPDU transmission and P2P SU PPDU transmission during intra-TXOP SP.

The upper part of FIG. 14 shows a PPDU exchange procedure between the AP and STA-1 during the Intra-TXOP SP based on the newly proposed MU-RTS. The lower part of FIG. 14 shows a procedure for exchanging PPDUs between P2P STA-1 and P2P STA-2 during Intra-TXOP SP based on the newly proposed MU-RTS.

2. Embodiments Applicable to this Specification

As described above, the AP may transmit a trigger frame of the MU-RTS type to start allocating a period in which the UE can perform SU transmission. The Trigger frame includes information indicating that the UE can start SU transmission. Upon receiving the trigger frame, the terminal sets a TXOP for SU transmission based on the information indicated in the trigger frame, and attempts SU PPDU transmission in the set TXOP. At this time, the UE may transmit the SU PPDU to the AP or transmit the SU PPDU to the P2P peer STA. In this specification, a method of efficiently using TXOP allocated for a trigger frame is proposed.

As described above, in the interval allocated to the trigger frame, the UE will attempt to transmit the SU PPDU to the AP or P2P peer STA. Also, the UE may transmit the SU PPDU to the AP. At this time, transmission of the first SU PPDU may fail. In this case, according to the existing EDCA operation, the terminal may attempt frame transmission by increasing the contention window (CW) exponentially and then performing contention again. Alternatively, the terminal may perform a PIFS operation. For example, if the channel is idle during PIFS after transmitting the SU PPDU, the same frame can be retransmitted or a new frame can be transmitted immediately after PIFS. In this case, the AP cannot confirm whether the SU PPDU is a frame transmitted to itself or an SU PPDU transmitted by the UE to the P2P peer STA, and may continue to wait. However, if the SU PPDU transmitted by the UE is a frame transmitted to the corresponding AP, the AP can receive the UL frame because it can know that the UE is using the corresponding TXOP to transmit to the corresponding AP. If the SU PPDU transmitted by the UE is a P2P frame, it can be known that the UE uses the allocated TXOP to transmit the P2P SU frame. In the case of P2P SU frame transmission, if the AP is a soft AP, it may enter a doze state to reduce power consumption. However, in P2P SU PPDU transmission, the terminal may reduce power, and in this case, the AP may not properly receive the transmission from the terminal, and a standby state may occur.

To solve this problem, when the AP transmits a response frame after receiving a trigger frame (or new MU-RTS) transmitted for SU PPDU transmission assignment, the UE transmits the SU PPDU to the AP in the response frame. It includes information on whether to transmit the SU PPDU to the P2P peer STA and transmits it. After transmitting the response frame, the UE transmits the SU PPDU to the AP or P2P peer STA. If the response frame is a CTS frame, the following information is included in the CTS frame and sent.

- SU PPDU type: Indicates the type of SU PPDU to be transmitted in the remaining TXOP after transmitting the response frame (CTS frame).

When the SU PPDU type is set to 0, transmission of the SU PPDU to the AP during the TXOP period is indicated (SU PPDU to AP). When the SU PPDU type is set to 1, transmission of the SU PPDU to the P2P peer STA during the TXOP period is indicated (SU PPDU to P2P Peer STA). If the UE has not decided which SU PPDU type to transmit, it is advantageous to set it to 0 as a default value. That is, since there is a possibility of entering a doze state like a soft AP, the default value of the SU PPDU type included in the CTS frame is set to 0, and when transmission to a P2P peer STA is requested or when transmission to a P2P peer STA is allowed (SU PPDU transmission to the AP is still possible) is set to 1.

Figure 15:
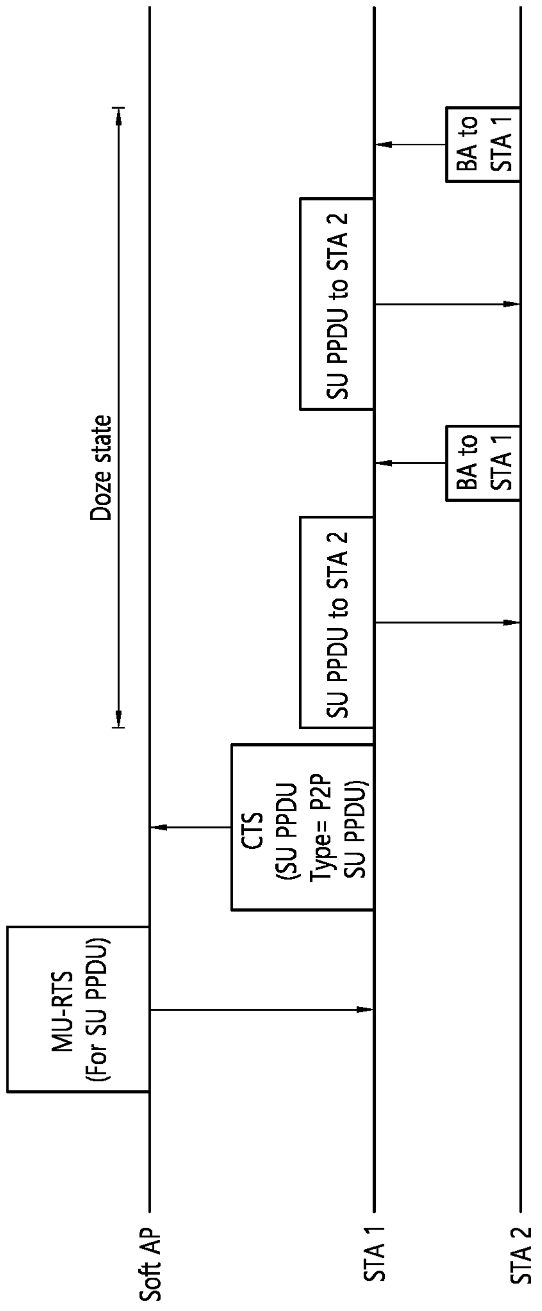
FIG. 15 shows an example of configuring a TXOP based on a MU-RTS frame and transmitting an SU PPDU.

FIG. 15 shows an example of configuring a TXOP based on a MU-RTS frame and transmitting an SU PPDU.

Referring to FIG. 15, the Soft AP transmits MU-RTS to STA1, and STA1 responds with CTS. At this time, STA1 transmits the CTS by including information notifying P2P SU PPDU transmission. FIG. 15 shows an example in which a Soft AP enters a doze state for power saving. During the period allocated by the MU-RTS, STA1 transmits the SU PPDU to STA2.

Figure 16:
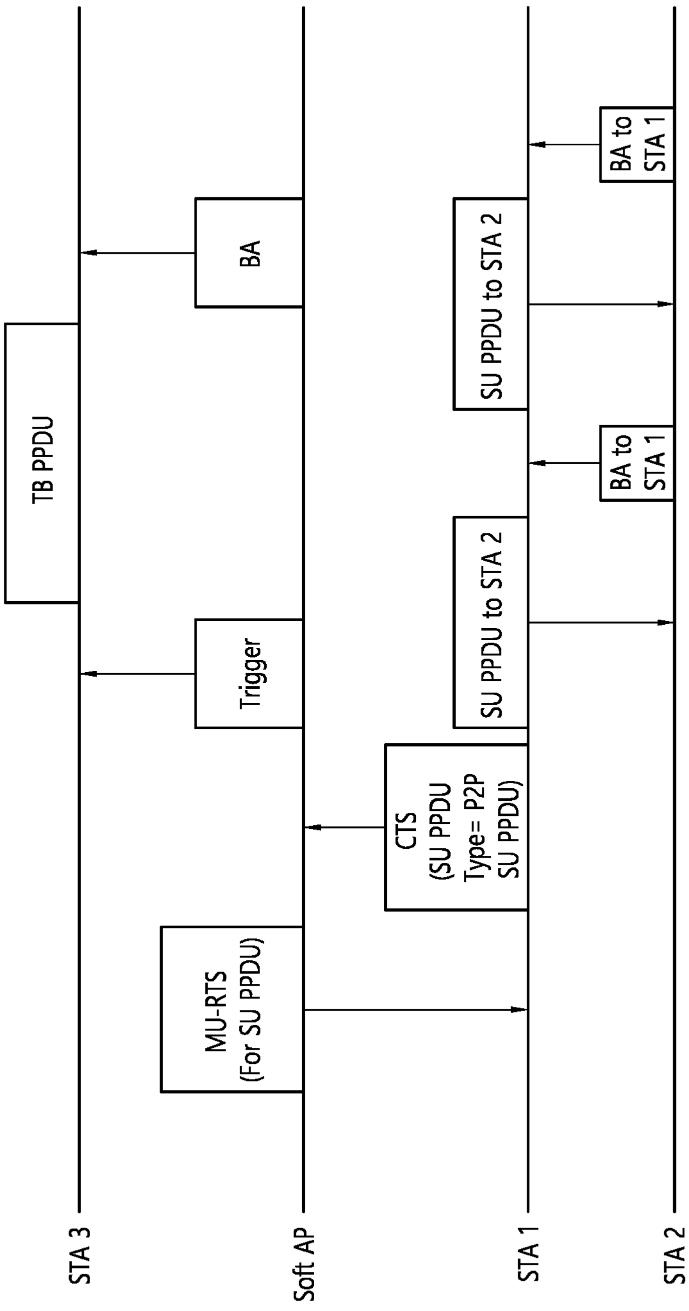
FIG. 16 shows another example of configuring a TXOP based on a MU-RTS frame and transmitting an SU PPDU.

FIG. 16 shows another example of configuring a TXOP based on a MU-RTS frame and transmitting an SU PPDU.

Referring to FIG. 16, the soft AP triggers a TB PPDU by transmitting a trigger frame to another STA (STA3) during the remaining period after receiving the CTS. At this time, the Soft AP and STA2 are hidden from each other, and STA3, STA1, and STA2 are hidden from each other. Here, the soft AP shows an example of transmitting another frame (trigger frame) to another STA (STA3) in a hidden relationship with the STA (STA1) that has transmitted the CTS without entering the doze state. STA1, STA2, and STA3 of FIG. 16 may collide during carrier sensing, but collision may be prevented through RTS/CTS or overhearing. At this time, the trigger frame transmitted to the STA3 and the SU PPDU transmitted to the STA2 may be transmitted and received based on spatial reuse.

Figure 17:
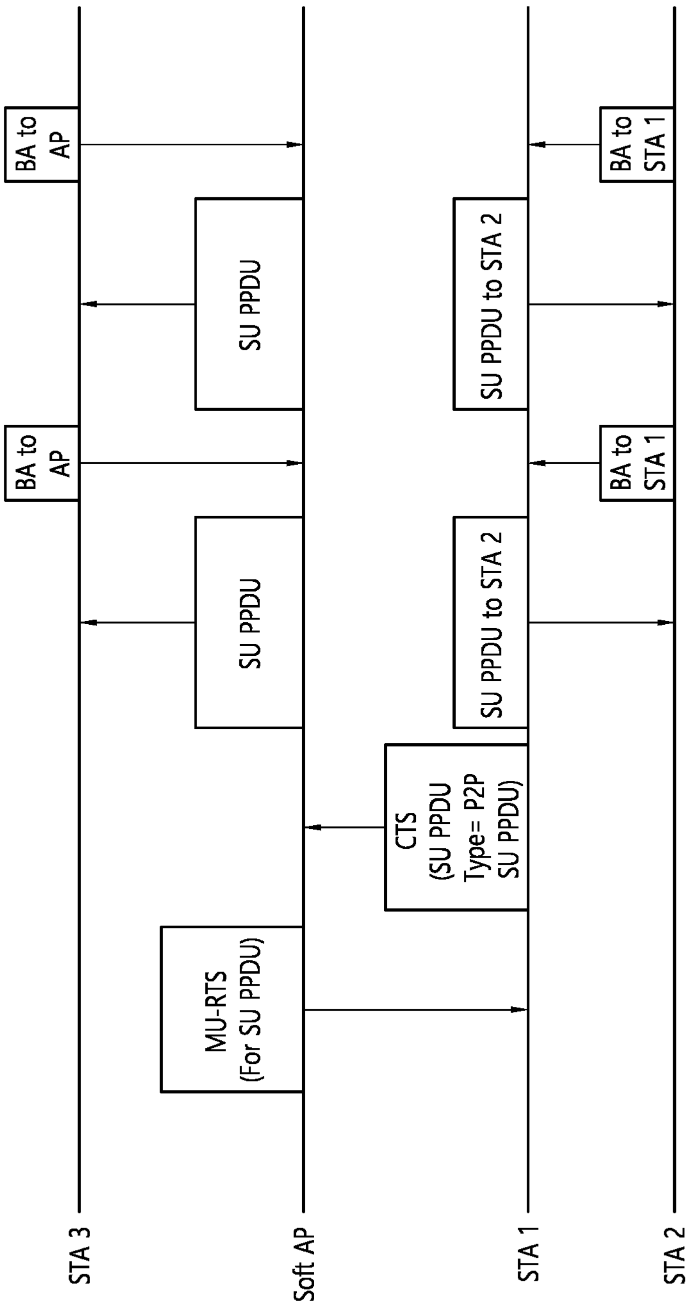
FIG. 17 shows another example of configuring a TXOP based on a MU-RTS frame and transmitting an SU PPDU.

FIG. 17 shows another example of configuring a TXOP based on a MU-RTS frame and transmitting an SU PPDU.

Referring to FIG. 17, after receiving the CTS, the Soft AP transmits a DL SU PPDU to another STA (STA3) during the remaining period of the TXOP. At this time, the Soft AP and STA2 are hidden from each other, and STA3, STA1, and STA2 are hidden from each other. Here, the soft AP transmits another PPDU (SU PPDU) to another STA (STA3) in a hidden relationship with the STA (STA1) that has transmitted the CTS without entering the doze state. STA1, STA2, and STA3 of FIG. 17 may collide during carrier sensing, but collision may be prevented through RTS/CTS or overhearing. In this case, the SU PPDU transmitted to the STA3 and the SU PPDU transmitted to the STA2 may be transmitted and received based on spatial reuse.

Figure 18:
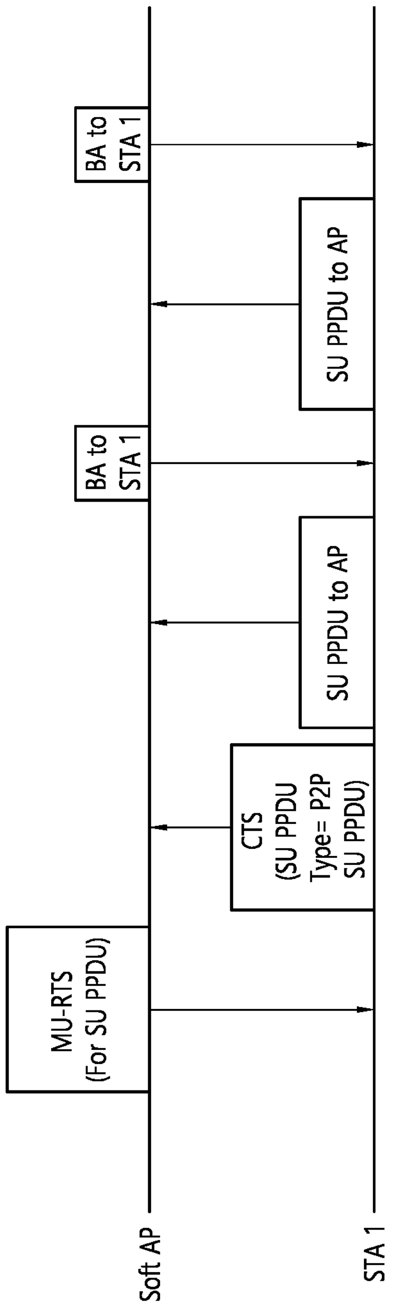
FIG. 18 shows another example of configuring a TXOP based on a MU-RTS frame and transmitting an SU PPDU.

FIG. 18 shows another example of configuring a TXOP based on a MU-RTS frame and transmitting an SU PPDU.

Referring to FIG. 18, upon receiving the MU-RTS from the AP, STA1 transmits a response frame, CTS, to the AP. At this time, the CTS includes information indicating that the SU PPDU is transmitted to the AP. STA1 transmits the SU PPDU to the AP after transmitting the response frame. After receiving the CTS, the Soft AP expects to receive the SU PPDU from STA1.

Hereinafter, the above-described embodiment will be described with reference to FIGS. 1 to 18.

Figure 19:
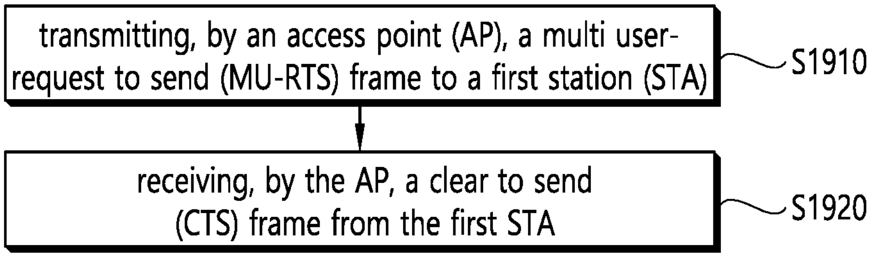
FIG. 19 is a flowchart illustrating a procedure for configuring a TXOP for SU transmission by an AP based on a trigger frame according to this embodiment.

FIG. 19 is a flowchart illustrating a procedure for configuring a TXOP for SU transmission by an AP based on a trigger frame according to this embodiment.

The example of FIG. 19 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for transmitting an SU PPDU from an STA to a peer STA in a TXOP period allocated by a trigger frame (MU-RTS frame).

In step S1910, an access point (AP) transmits a multi user-request to send (MU-RTS) frame to a first station (STA). The MU-RTS frame may be a MU-RTS trigger frame or a MU-RTS TXOP Sharing (TXS) trigger frame.

In step S1920, the AP receives a clear to send (CTS) frame from the first STA.

The MU-RTS frame includes information on a Transmission Opportunity (TXOP) period in which the first SU PPDU can be transmitted. The TXOP period may be set between the AP and the first STA from the transmission of the MU-RTS frame.

The CTS frame includes type information. The type information may be set to a first value or a second value. The first value may include information that the first SU PPDU is transmitted to the AP during the TXOP period. The second value may include information that the first SU PPDU is transmitted to the second STA during the TXOP period.

The AP may be set to a doze state after receiving the CTS frame. For example, when the type information is set to the second value, the first STA transmits the first SU PPDU to the second STA, and at this time, the AP may be set to a doze state for power saving. Since the AP is a Soft AP and the second STA is a peer STA of the first STA, when the first STA transmits a SU PPDU to the second STA, the AP not involved in transmission needs to be set to a doze state to save power. When the type information is set to the first value, since the first STA transmits the first SU PPDU to the AP, the AP may maintain an awake state.

That is, this embodiment proposes a method in which the first STA transmits an SU PPDU to the second STA (peer STA) in the TXOP period allocated based on the MU-RTS frame. The TXOP period may be shared with the second STA after the CTS frame is transmitted, and accordingly, the STA can transmit the SU PPDU during the shared TXOP interval to the peer STA. The AP may have a hidden node relationship with the second STA.

Assume that the AP maintains an awake state after receiving the CTS frame. Regardless of the value set for the type information, the AP can always maintain an awake state. In this case, the AP may transmit a trigger frame or a second SU PPDU to the third STA during the TXOP period. The third STA may have a hidden node relationship with the first and second STAs. In this case, the TXOP period may also be shared with the third STA after the CTS frame is transmitted. Accordingly, the AP can transmit the second PPDU (separate SU PPDU) during the TXOP period shared with the third STA (another STA).

The first STA may receive a Block Ack (BA) for the first SU PPDU from the AP or the second STA. In this case, the first SU PPDU and the trigger frame or the second SU PPDU may be transmitted and received based on spatial reuse. In addition, the BA for the TB PPDU triggered by the trigger frame or the second SU PPDU, and the BA for the first SU PPDU may also be transmitted and received based on spatial reuse.

Figure 20:
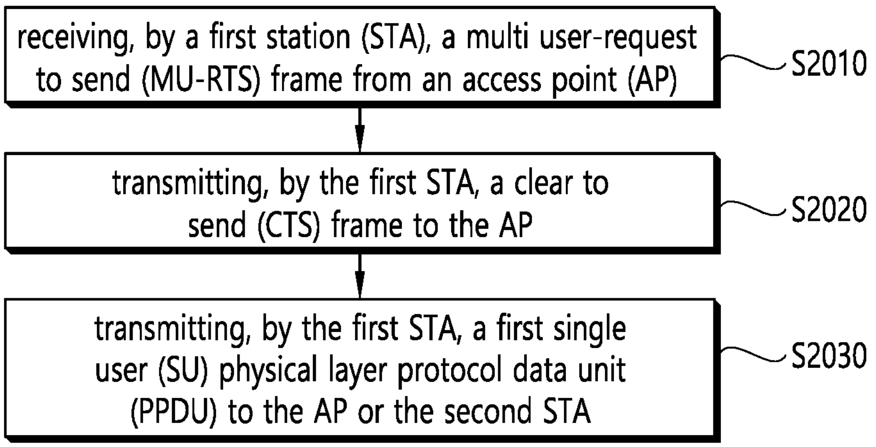
FIG. 20 is a flowchart illustrating a procedure for performing SU transmission by an STA based on a trigger frame according to this embodiment.

FIG. 20 is a flowchart illustrating a procedure for performing SU transmission by an STA based on a trigger frame according to this embodiment.

The example of FIG. 20 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment proposes a method and apparatus for transmitting an SU PPDU from an STA to a peer STA in a TXOP period allocated by a trigger frame (MU-RTS frame).

In step S2010, a first station (STA) receives a multi user-request to send (MU-RTS) frame from an access point (AP). The MU-RTS frame may be a MU-RTS trigger frame or a MU-RTS TXOP Sharing (TXS) trigger frame.

In step S2020, the first STA transmits a clear to send (CTS) frame to the AP.

In step S2030, the first STA transmits a first single user (SU) physical layer protocol data unit (PPDU) to the AP or the second STA.

The MU-RTS frame includes information on a Transmission Opportunity (TXOP) period in which the first SU PPDU can be transmitted. The TXOP period may be set between the AP and the first STA from the transmission of the MU-RTS frame.

The CTS frame includes type information. The type information may be set to a first value or a second value. The first value may include information that the first SU PPDU is transmitted to the AP during the TXOP period. The second value may include information that the first SU PPDU is transmitted to the second STA during the TXOP period.

The AP may be set to a doze state after receiving the CTS frame. For example, when the type information is set to the second value, the first STA transmits the first SU PPDU to the second STA, and at this time, the AP may be set to a doze state for power saving. Since the AP is a Soft AP and the second STA is a peer STA of the first STA, when the first STA transmits a SU PPDU to the second STA, the AP not involved in transmission needs to be set to a doze state to save power. When the type information is set to the first value, since the first STA transmits the first SU PPDU to the AP, the AP may maintain an awake state.

That is, this embodiment proposes a method in which the first STA transmits an SU PPDU to the second STA (peer STA) in the TXOP period allocated based on the MU-RTS frame. The TXOP period may be shared with the second STA after the CTS frame is transmitted, and accordingly, the STA can transmit the SU PPDU during the shared TXOP interval to the peer STA. The AP may have a hidden node relationship with the second STA.

Assume that the AP maintains an awake state after receiving the CTS frame. Regardless of the value set for the type information, the AP can always maintain an awake state. In this case, the AP may transmit a trigger frame or a second SU PPDU to the third STA during the TXOP period. The third STA may have a hidden node relationship with the first and second STAs. In this case, the TXOP period may also be shared with the third STA after the CTS frame is transmitted. Accordingly, the AP can transmit the second PPDU (separate SU PPDU) during the TXOP period shared with the third STA (another STA).

The first STA may receive a Block Ack (BA) for the first SU PPDU from the AP or the second STA. In this case, the first SU PPDU and the trigger frame or the second SU PPDU may be transmitted and received based on spatial reuse. In addition, the BA for the TB PPDU triggered by the trigger frame or the second SU PPDU, and the BA for the first SU PPDU may also be transmitted and received based on spatial reuse.

3. Device Configuration

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure receives a multi user-request to send (MU-RTS) frame from an access point (AP); transmits a clear to send (CTS) frame to the AP; and transmits a first single user (SU) physical layer protocol data unit (PPDU) to the AP or the second station (STA).

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving a multi user-request to send (MU-RTS) frame from an access point (AP); transmitting a clear to send (CTS) frame to the AP; and transmitting a first single user (SU) physical layer protocol data unit (PPDU) to the AP or the second station (STA). At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

transmitting, by an access point (AP), a multi user-request to send (MU-RTS) Transmission Opportunity (TXOP) sharing (TXS) trigger frame to a first non-access point (non-AP) station (STA); and receiving, by the AP, a clear to send (CTS) frame from the first non-AP STA, wherein first data is transmitted within an allocated time by the first non-AP STA to a second non-AP STA, the allocated time being a portion of an obtained TXOP, wherein the MU-RTS TXS trigger frame includes information on the allocated time for the first non-AP STA, and wherein any data is not transmitted by the first non-AP STA to the second non-AP STA or to the AP during a remaining period of the obtained TXOP; and transmitting, by the AP, second data to a third non-AP STA subsequent to the allocated time during the remaining period of the obtained TXOP.

2. The method of claim 1, wherein the CTS frame includes type information, wherein the AP is set to a doze state after receiving the CTS frame, wherein the type information is set to a first value or a second value, wherein the first value indicates that the first data is transmitted to the AP during the allocated time, wherein the second value indicates information that the first data is transmitted to the second non-AP STA during the allocated time.

3. The method of claim 2, wherein when the AP maintains an awake state after receiving the CTS frame, the AP transmits a trigger frame or the second data to the third non-AP STA after a Point Interframe Space (PIFS) from an end of the allocated time, the third STA has a hidden node relationship with the first and second non-AP STAs, the AP has a hidden node relationship with the second non-AP STA.

4. The method of claim 3, wherein the allocated time is shared by the second and third non-AP STAs after the CTS frame is transmitted.

5. The method of claim 2, wherein the AP is a Soft AP, and wherein the second non-AP STA is a peer non-AP STA of the first non-AP STA.

6. An access point (AP) in a wireless local area network (WLAN) system, the AP comprising:

a memory;

a transceiver; and a processor operatively coupled to the memory and the transceiver, wherein processor is configured to:

transmit a multi user-request to send (MU-RTS) Transmission Opportunity (TXOP) sharing (TXS) trigger frame to a first non-access point (non-AP) station (STA); and receive a clear to send (CTS) frame from the first non-AP STA, wherein first data is transmitted within an allocated time by the first non-AP STA to a second non-AP STA, the allocated time being a portion of an obtained TXOP, wherein the MU-RTS TXS trigger frame includes information on the allocated time for the first non-AP STA, and wherein any data is not transmitted by the first non-AP STA to the second non-AP STA or to the AP during a remaining period of the obtained TXOP; and transmit second data to a third non-AP STA subsequent to the allocated time during the remaining period of the obtained TXOP.

* * * * *